United States Patent
Uchida et al.

(10) Patent No.: US 11,262,432 B2
(45) Date of Patent: Mar. 1, 2022

(54) POSITIONING APPARATUS AND POSITIONING METHOD

(71) Applicant: TOSHIBA TEC KABUSHIKI KAISHA, Tokyo (JP)

(72) Inventors: Shigeo Uchida, Mishima Shizuoka (JP); Yu Yoshiie, Yokohama Kanagawa (JP); Akihiko Fujiwara, Kawasaki Kanagawa (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 330 days.

(21) Appl. No.: 16/293,708

(22) Filed: Mar. 6, 2019

(65) Prior Publication Data

US 2019/0324113 A1 Oct. 24, 2019

(30) Foreign Application Priority Data

Apr. 23, 2018 (JP) .............................. JP2018-082438

(51) Int. Cl.
*G01S 5/02* (2010.01)
*G01S 11/06* (2006.01)

(52) U.S. Cl.
CPC .............. *G01S 5/0294* (2013.01); *G01S 11/06* (2013.01); *G01S 5/0231* (2013.01)

(58) Field of Classification Search
CPC ....... G01S 5/0294; G01S 11/06; G01S 5/0231
USPC .................................................. 342/451, 149
See application file for complete search history.

(56) References Cited

U.S. PATENT DOCUMENTS

| | | | | |
|---|---|---|---|---|
| 6,963,303 B1* | 11/2005 | Beisner | ................... | G01S 7/292 342/159 |
| 2013/0328715 A1* | 12/2013 | Jinkins | ................... | G01S 13/953 342/26 B |
| 2015/0049229 A1* | 2/2015 | Liu | ................... | H01L 27/14621 348/308 |

FOREIGN PATENT DOCUMENTS

JP 2016-206017 12/2016

* cited by examiner

*Primary Examiner* — Bo Fan
(74) *Attorney, Agent, or Firm* — Amin, Turocy & Watson, LLP

(57) ABSTRACT

A positioning apparatus comprises an acquiring section which acquires an azimuth angle and an angular velocity of a moving object from values measured by sensors of the moving object moving in a positioning area; a storage section which stores a coefficient of a relational expression established between a moving speed and a standard deviation of the angular velocity of the moving object in association with each of a plurality of division areas for dividing the positioning area; and a positioning section which specifies a division area where the moving object is positioned per unit time to acquire the stored coefficient in association with the division area, and calculates the moving speed in the division area from the coefficient and the standard deviation of the acquired angular velocity to measure a position of the moving object in the positioning area from the moving speed and the acquired azimuth angle.

20 Claims, 10 Drawing Sheets

232

| TIME | PDRx | PDRy | ANGLE (°) | ANGULAR VELOCITY (rad/s) | COEFFICIENT a | COEFFICIENT b | MOVING SPEED (m/s) |
|---|---|---|---|---|---|---|---|
| 10:10:10 | PRDx1 | PRDy1 | θ1 | ω1 | | | |
| 10:10:11 | PRDx2 | PRDy2 | θ2 | ω2 | | | |
| 10:10:12 | PRDx3 | PRDy3 | θ3 | ω3 | | | |
| 10:10:13 | PRDx4 | PRDy4 | θ4 | ω4 | | | |
| 10:10:14 | PRDx5 | PRDy5 | θ5 | ω5 | | | |
| 10:10:15 | PRDx6 | PRDy6 | θ6 | ω6 | | | |
| 10:10:16 | PRDx7 | PRDy7 | θ7 | ω7 | | | |
| 10:10:17 | PRDx8 | PRDy8 | θ8 | ω8 | | | |
| 10:10:18 | PRDx9 | PRDy9 | θ9 | ω9 | | | |
| 10:10:19 | PRDx10 | PRDy10 | θ10 | ω10 | | | |
| 10:10:20 | PRDx11 | PRDy11 | θ11 | ω11 | | | |
| 10:10:21 | PRDx12 | PRDy12 | θ12 | ω12 | | | |
| 10:10:22 | PRDx13 | PRDy13 | θ13 | ω13 | | | |
| 10:10:23 | PRDx14 | PRDy14 | θ14 | ω14 | | | |
| 10:10:24 | PRDx15 | PRDy15 | θ15 | ω15 | | | |

| TIME | ID | RSSI |
|---|---|---|
| 10:10:10 | 100 | -83 |
| 10:10:11 | 100 | -80 |
| 10:10:12 | 100 | -84 |
| 10:10:13 | 100 | -87 |
| 10:10:14 | 200 | -86 |
| 10:10:15 | 200 | -82 |
| 10:10:16 | 200 | -85 |
| 10:10:17 | 200 | -88 |
| 10:10:18 | 300 | -85 |
| 10:10:19 | 300 | -82 |
| 10:10:20 | 300 | -81 |
| 10:10:21 | 300 | -84 |
| 10:10:22 | 400 | -85 |
| 10:10:23 | 400 | -83 |
| 10:10:24 | 400 | -78 |

| TIME | PDRx | PDRy | ANGLE (°) | ANGULAR VELOCITY (rad/s) | COEFFICIENT a | COEFFICIENT b | MOVING SPEED (m/s) |
|---|---|---|---|---|---|---|---|
| 10:10:10 | PRDx1 | PRDy1 | θ1 | ω1 | | | |
| 10:10:11 | PRDx2 | PRDy2 | θ2 | ω2 | | | |
| 10:10:12 | PRDx3 | PRDy3 | θ3 | ω3 | | | |
| 10:10:13 | PRDx4 | PRDy4 | θ4 | ω4 | | | |
| 10:10:14 | PRDx5 | PRDy5 | θ5 | ω5 | | | |
| 10:10:15 | PRDx6 | PRDy6 | θ6 | ω6 | | | |
| 10:10:16 | PRDx7 | PRDy7 | θ7 | ω7 | | | |
| 10:10:17 | PRDx8 | PRDy8 | θ8 | ω8 | | | |
| 10:10:18 | PRDx9 | PRDy9 | θ9 | ω9 | | | |
| 10:10:19 | PRDx10 | PRDy10 | θ10 | ω10 | | | |
| 10:10:20 | PRDx11 | PRDy11 | θ11 | ω11 | | | |
| 10:10:21 | PRDx12 | PRDy12 | θ12 | ω12 | | | |
| 10:10:22 | PRDx13 | PRDy13 | θ13 | ω13 | | | |
| 10:10:23 | PRDx14 | PRDy14 | θ14 | ω14 | | | |
| 10:10:24 | PRDx15 | PRDy15 | θ15 | ω15 | | | |

POSITIONING APPARATUS AND POSITIONING METHOD

CROSS-REFERENCE TO RELATED APPLICATION

This application is based upon and claims the benefit of priority from Japanese Patent Application No. P2018-082438, filed on Apr. 23, 2018 the entire contents of which are incorporated herein by reference.

FIELD

Embodiments recorded herein relate generally to a positioning apparatus and a positioning method.

BACKGROUND

A satellite positioning system is known as a type of a positioning system. The satellite positioning system measures a current position of a positioning target on the ground using a satellite. The satellite positioning system can measure the position highly accurately under the environment at which a signal from an artificial satellite arrives. Under the environment at which the signal from the artificial satellite does not arrive, such as indoor space or underground space, the positioning becomes unstable or impossible.

A positioning system called dead reckoning is known as another type of the positioning system. The dead reckoning measures a position of a positioning target by measuring a moving direction (azimuth angle) and a moving distance (distance) of the positioning target using an acceleration sensor, a gyro sensor (angular velocity sensor), a geomagnetic sensor (electronic compass) or the like. The dead reckoning can measure the position even in the indoor space or the underground space.

The dead reckoning includes a PDR (Pedestrian Dead Reckoning) that measures a position of a pedestrian using a sensor of a terminal carried by the pedestrian, and a CDR (Cart Dead Reckoning) that measures a position of a moving object using a sensor provided in the moving object such as a vehicle. In the case of the CDR, the accuracy of positioning varies depending on a state of the surface on which the moving object moves. For example, when the moving object moves on a smooth surface and when the moving object moves on an uneven surface, a difference occurs in the moving speed obtained from values by the sensors even at the same speed. If a difference occurs in the moving speed, an error is generated in the moving distance. Because the CDR performs measurement by integrating the moving direction and the moving distance per unit time, the error in the moving distance leads to the decrease in the positioning accuracy.

DESCRIPTION OF THE DRAWINGS

FIG. 4 is a schematic diagram illustrating an example of data recorded in a first table shown in FIG. 3;

FIG. 5 is a schematic diagram illustrating an example of data recorded in a second table shown in FIG. 3;

DETAILED DESCRIPTION

In accordance with an embodiment, a positioning apparatus comprises an acquiring section configured to acquire an azimuth angle and an angular velocity of a moving object from values measured by sensors of the moving object moving in a positioning area; a storage section configured to store a coefficient of a relational expression established between a moving speed and a standard deviation of the angular velocity of the moving object in association with each of a plurality of division areas for dividing the positioning area; and a positioning section configured to specify a division area where the moving object is positioned per unit time to acquire the coefficient stored in the storage section in association with the division area, and to calculate the moving speed of the moving object in the division area from the coefficient and the standard deviation of the angular velocity acquired by the acquiring section to measure a position of the moving object in the positioning area from the moving speed and the azimuth angle of the moving object which is acquired by the acquiring section.

Hereinafter, an embodiment of a positioning apparatus which can accurately measure a position of a moving object regardless of a state of a surface on which the moving object moves is recorded with reference to the accompanying drawings.

First Embodiment

Figure 1:
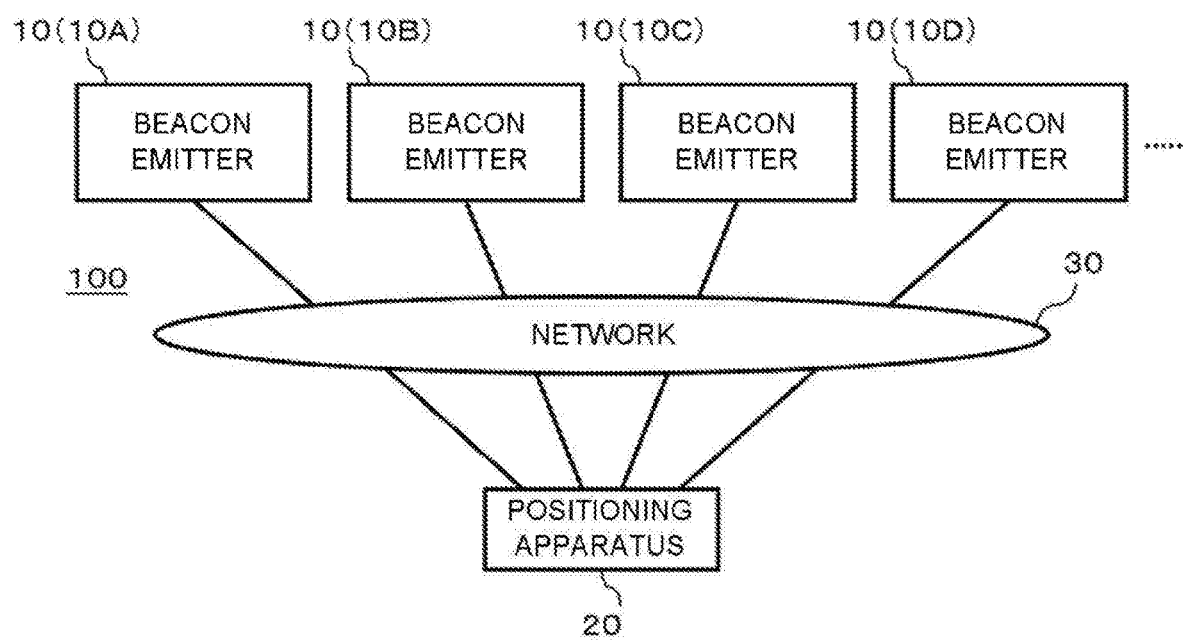
FIG. 1 is a diagram illustrating an overall configuration of a positioning system according to an embodiment of a positioning apparatus.

FIG. 1 is a diagram illustrating an overall configuration of a positioning system 100 according to an embodiment of a positioning apparatus. The positioning system 100 includes a plurality of beacon emitters 10 (10A, 10B, 10C, 10D . . . ), a positioning apparatus 20 and a network 30. The network 30 enables near-field wireless communication between the beacon emitter 10 and the positioning apparatus 20 in conformity with Bluetooth® communication standard, for example.

Figure 2:
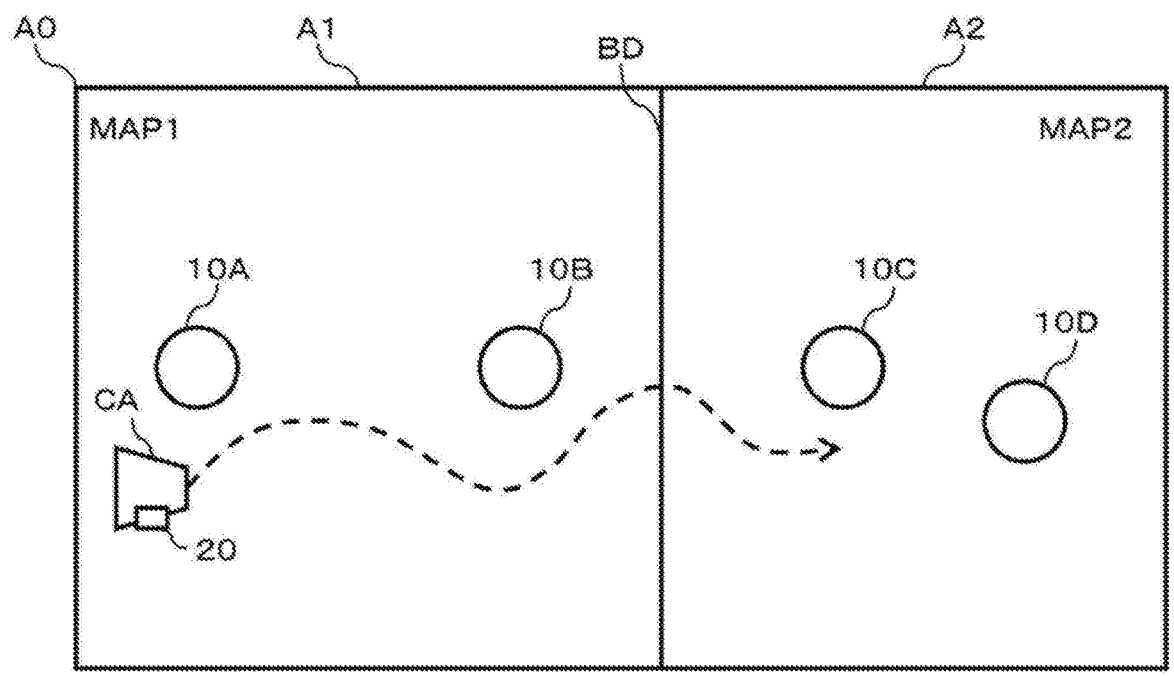
FIG. 2 is a schematic diagram illustrating an example of application of the positioning system shown in FIG. 1.

FIG. 2 is a schematic diagram illustrating an example of application of the positioning system 100 shown in FIG. 1. The positioning system 100 measures a position of a moving object CA in a positioning area A0 with the positioning apparatus 20 by using the moving object CA moving in the positioning area A0 as a positioning target. It is assumed that the positioning area A0 is in an environment at which a signal from an artificial satellite does not arrive such as a building such as a store, a factory, a warehouse, an office, or the like, or an underground space. The positioning area A0 may be in an environment at which a signal from a satellite can arrive. The moving object CA may be a moving object that is manually moved such as a shopping cart used in a retail store, a forklift used in a factory, a warehouse or the like, a power-driven moving object such as an electric cart, etc. The wheel of the moving object CA is not limited, and may be cylindrical tire or caterpillar. The wheel of the moving object CA may be formed into a sphere shape. The moving object CA may not necessarily roll to move.

The positioning area A0 is divided into a plurality of division areas A1, A2, . . . . The positioning area A0 is divided into a plurality of the division areas A1, A2, . . . according to a state of a surface on which the moving object CA moves. Specifically, the division areas A1, A2, . . . are divided according to the material of the surface. In other words, the positioning area A0 is divided so that the material of the surface within a division area is different from that of the surface of an adjacent another division area. For convenience of description, only two division areas A1 and A2 are shown in FIG. 2, but it is needless to say that the number of the division areas is not limited thereto.

The beacon emitters 10 (10A, 10B, 10C, 10D, . . . ) are spaced apart from one another so as to be scattered in the positioning area A0. At least one beacon emitter 10 is placed in each of the division areas A1, A2, . . . . The number of the beacon emitters 10 is not particularly limited. Considering an area of the positioning area A0, the number of the division areas A1, A2, . . . , the presence or absence of a partition or an obstacle, etc., an appropriate number of the beacon emitters 10 are placed at appropriate positions within the positioning area A0 as the positioning system 100.

The beacon emitter 10 transmits a beacon signal. Typically, the beacon emitter 10 repeatedly transmits a Bluetooth beacon signal conforming to the BLE (Bluetooth Low Energy) standard. The beacon emitter 10 may transmit a beacon signal other than the Bluetooth beacon signal. The beacon signal includes a beacon ID as identification information for specifying each beacon emitter 10. A different value of the beacon ID is set for each beacon emitter 10.

The positioning apparatus 20 is provided in the moving object CA which is the positioning target, and moves within the positioning area A0 as the moving object CA moves. The positioning apparatus 20 comprises a wireless unit for receiving a beacon signal emitted from each beacon emitter 10. The positioning apparatus 20 has a positioning function for measuring a position of the moving object CA using the CDR technology. Specifically, the positioning apparatus 20 includes a sensor unit including an acceleration sensor, a gyro sensor, a geomagnetic sensor, etc., and measures information indicating how far and in what direction the moving object CA moves, i.e., a moving direction (azimuth angle) and a moving distance (distance) based on signals from these sensors. In a relative coordinate system with the position of the moving object CA at the start of positioning as a base point (0, 0), for example, the positioning apparatus 20 calculates two-dimensional coordinates indicating a position of the moving object CA at the current time point, i.e., relative coordinates (PDRx, PDRy) from integration data of the moving direction and the moving distance of the moving object CA.

Figure 3:
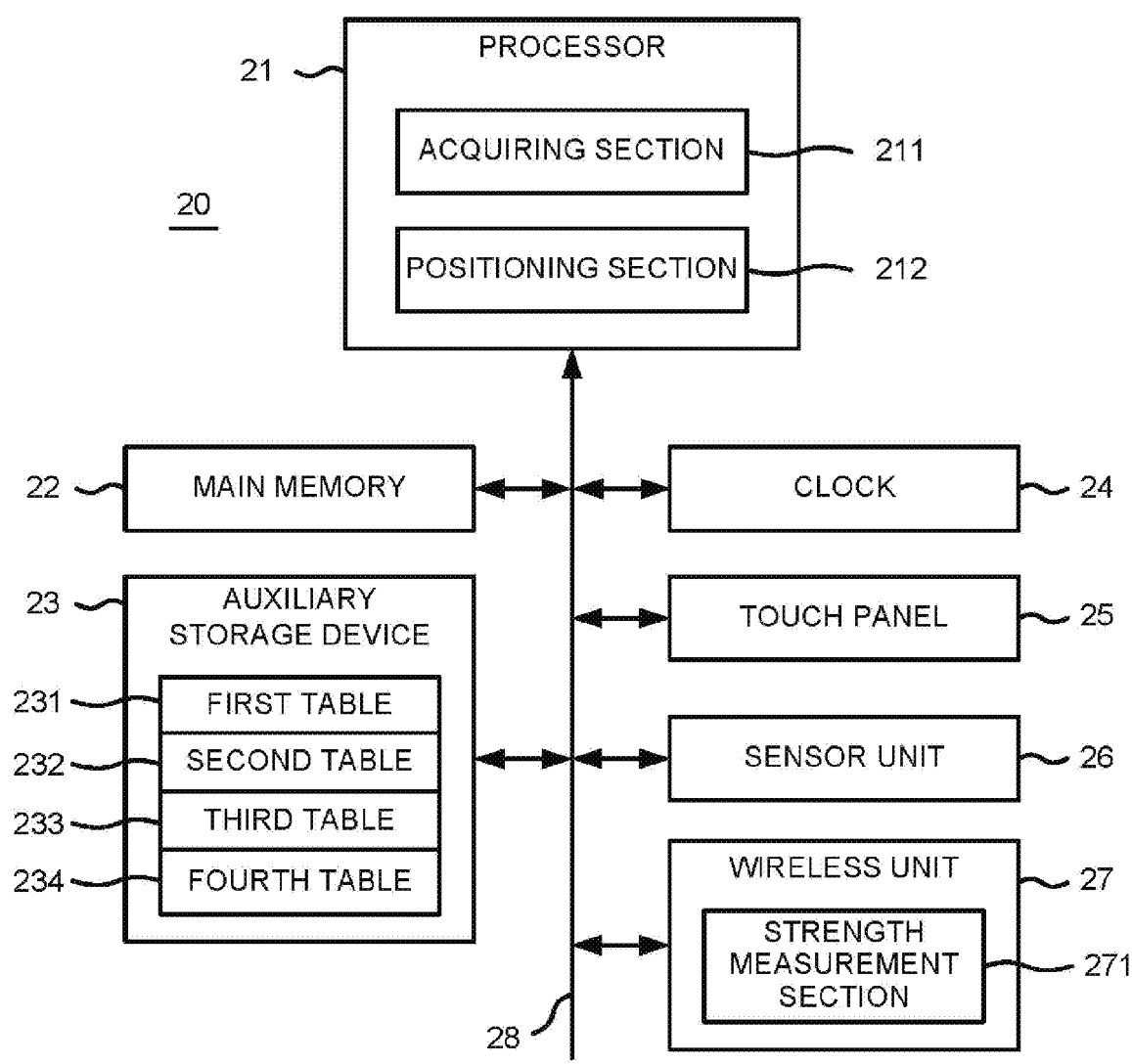
FIG. 3 is a block diagram illustrating a circuit configuration of main portions of the positioning apparatus according to a first embodiment.

FIG. 3 is a block diagram illustrating a circuit configuration of main portions of the positioning apparatus 20. The positioning apparatus 20 includes a processor 21, a main memory 22, an auxiliary storage device 23, a clock 24, a touch panel 25, a sensor unit 26, a wireless unit 27 and a system transmission path 28. The system transmission path 28 includes an address bus, a data bus, a control signal line, etc. The system transmission path 28 connects the processor 21 to the main memory 22, the auxiliary storage device 23, the clock 24, the touch panel 25, the sensor unit 26 and the wireless unit 27. The processor 21, the main memory 22 and the auxiliary storage device 23 are connected to each other via the system transmission path 28 to constitute a computer of the positioning apparatus 20.

The processor 21 acts as a central portion of the computer. The processor 21 executes an operating system and application programs to control each section to realize various functions of the positioning apparatus 20. The processor 21 is, for example, a CPU (Central Processing Unit).

The main memory 22 acts as a main memory portion of the computer. The main memory 22 includes a nonvolatile memory area and a volatile memory area. The main memory 22 stores the operating system and application programs in the nonvolatile memory area. The main memory 22 may store data necessary for the processor 21 to execute a processing to control each section in the nonvolatile memory area or in the volatile memory area. The main memory 22 uses the volatile memory area as a work area where data is appropriately rewritten by the processor 21. The nonvolatile memory area is, for example, a ROM (Read Only Memory). The volatile memory area is, for example, a RAM (Random Access Memory).

The auxiliary storage device 23 acts as an auxiliary storage portion of the computer. For example, the auxiliary storage device 23 may be an EEPROM (Electric Erasable Programmable Read-Only Memory), an HDD (Hard Disc Drive), an SSD (Solid State Drive) or the like. The auxiliary storage device 23 stores data used for the processor 21 to perform various processing and data generated in a processing executed in the processor 21. The auxiliary storage device 23 may also store the above-mentioned application programs in some cases.

The clock 24 counts the time. The processor 21 processes the time counted by the clock 24 as the current time.

The touch panel 25 functions as an input device and a display device of the positioning apparatus 20. The touch panel 25 receives an operation input by a user of the positioning apparatus 20. The touch panel 25 displays necessary information to the user of the positioning apparatus 20. The necessary information includes information indicating a positioning result.

The sensor unit 26 includes an acceleration sensor, a gyro sensor, a geomagnetic sensor, and the like, which are a group of sensors for the CDR. The acceleration sensor detects an acceleration of the positioning apparatus 20. The gyro sensor detects a rotational angular velocity of the positioning apparatus 20. The geomagnetic sensor measures a direction of magnetic field around the positioning apparatus 20 to detect the azimuth.

The wireless unit 27 receives a beacon signal emitted from the beacon emitter 10. The wireless unit 27 is capable of receiving a plurality of beacon signals emitted from the beacon emitters 10. The wireless unit 27 has a strength measurement section 271, and measures reception strength, i.e., a so-called RSSI (Received Signal Strength Indication) with the strength measurement section 271 each time the beacon signal is received. The wireless unit 27 outputs the beacon data including the beacon ID of the received beacon data including a beacon ID of the received beacon signal and a RSSI value at the time of receiving the beacon signal to the processor 21.

In the positioning apparatus 20 having such a configuration, a computer having the processor 21 as the central portion cooperates with hardware to function as an acquiring section 211 and a positioning section 212. The hardware is, for example, the main memory 22, the auxiliary storage device 23, the clock 24, the touch panel 25, the sensor unit 26, the wireless unit 27 and the like.

The acquiring section 211 acquires an azimuth angle indicating the moving direction of the moving object CA and an angular velocity when the moving object CA moves per unit time from measurement values by the sensor unit 26 provided in the moving object CA moving in the positioning area A0.

The positioning section 212 specifies the division areas A1, A2, . . . in which the moving object CA is positioned per unit time. The positioning section 212 acquires coefficients respectively associated with the specified division areas A1, A2, . . . from the storage section. The coefficients and the storage unit are described later. The positioning section 212 calculates a moving speed of the moving object CA in the division areas A1, A2, . . . from the coefficients acquired from the storage section and a standard deviation of the angular velocity acquired by the acquiring section 211. The positioning section 212 measures a position of the moving object CA from the calculated moving speed and the azimuth angle of the moving object CA acquired by the acquiring section 211.

In order to realize the functions of the acquiring section 211 and the positioning section 212 described above, the positioning apparatus 20 stores a first table 231, a second table 232, a third table 233 and a fourth table 234 in the auxiliary storage device 23. The positioning apparatus 20 stores a positioning program in the main memory 22 or the auxiliary storage device 23.

FIG. 4 shows an example of data recorded in the first table 231. As shown in FIG. 4, the first table 231 has an area for recording the beacon ID and the RSSI value in association with the time.

The processor 21 acquires beacon data output from the wireless unit 27 every time one second elapses from the time counted by the clock 24, for example. At this time, if a plurality of beacon signals is received in the wireless unit 27, the processor 21 acquires the respective beacon data. Every time one second elapses, the processor 21 extracts beacon data including the largest RSSI value measured by the strength measurement section 271 from the acquired beacon data, and records the beacon ID and the RSSI value included in the beacon data in the first table 231 together with the time.

FIG. 5 shows an example of data recorded in the second table 232. As shown in FIG. 5, the second table 232 has an area for recording relative coordinates (PDRx, PDRy), an angle (°), an angular velocity (rad/s), a first coefficient a, a second coefficient b and a moving speed (m/s) in association with the time. The angle (°) indicates the moving direction (i.e., the azimuth angle) of the positioning target. The first coefficient a and the second coefficient b are described later.

The processor 21 records the relative coordinates (PDRx, PDRy), the angle (°) and the angular velocity (rad/s) obtained from the signals from sensors of the sensor unit 26 in the second table 232 each time one second elapses from the time counted by the clock 24. In an information processing realized by executing the positioning program, the processor 21 records the first coefficient a, the second coefficient b and the moving speed (m/s) in the second table 232. Here, the computer having the processor 21 as the central portion functions as the acquiring section 211.

Figure 6:
FIG. 6 is a schematic diagram illustrating an example of data recorded in a third table shown in FIG. 3.

FIG. 6 is an example of data recorded in the third table 233. As shown in FIG. 6, the third table 233 has an area for recording map information MAP in association with the beacon ID of the beacon emitter 10.

The map information MAP is uniquely set to each of the division areas A1, A2, . . . obtained by dividing the positioning area A0. For example, in FIG. 2, map information MAP1 is set for one division area A1, and map information MAP2 is set for the other division area A2. A beacon emitter 10A of which the beacon ID is "100" and a beacon emitter 10B of which the beacon ID is "200" are positioned in the division area A1 for which the MAP information MAP1 is set. A beacon emitter 10C of which the beacon ID is "300" and a beacon emitter 10D of which the beacon ID is "400" are positioned in the division area A2 for which the MAP information MAP2 is set. In the case of such a layout, for example, an administrator of the positioning system 100 creates the third table 233 in which the data shown in FIG. 6 is recorded and stores it in the auxiliary storage device 23.

Figure 7:
FIG. 7 is a schematic diagram illustrating an example of data recorded in a fourth table shown in FIG. 3.

FIG. 7 shows an example of data stored in the fourth table 234. As shown in FIG. 7, the fourth table 234 has an area for recording the first coefficient a and the second coefficient b in association with the map information MAP.

In the CDR for measuring the position of the moving object CA using the sensor unit 26 provided in the moving object CA, a relationship between the moving speed S (m/s) of the moving object CA and the standard deviation W of the angular velocity (rad/s) of the moving object CA is expressed by a relational expression, i.e., a linear function relationship indicated by the following Formula (1).

$$S=a*W+b \tag{1}$$

In Formula (1), "a" is the first coefficient a. "b" is the second coefficient b. The first coefficient a and the second coefficient b depend on the material of the surface of the positioning area A0 on which the moving object CA moves. For example, the administrator of the positioning system 100 calculates the first coefficient a "C11" and the second coefficient b "C12" with which Formula (1) is satisfied for the material of the surface in the division area A1. The administrator calculates the first coefficient a "C21" and the second coefficient b "C22" with which Formula (1) is satisfied for the material of the surface in the division area A2. The administrator creates the fourth table 234 for recording the first coefficient a and the second coefficient b calculated for each of the division areas A1, A2, . . . , in association with the map information MAP1, MAP2 set for each of the division areas A1, A2, . . . , correspondingly, and stores it in the auxiliary storage device 23.

The relational expression is not necessarily limited to the linear function of Formula (1).

Here, the third table 233 and the fourth table 234 constitute a storage section for storing the first coefficient a and the second coefficient b of the relational expression satisfied between the moving speed S (m/s) and the standard deviation W of the angular velocity (rad/s) in association with each of the plurality of the division areas A1, A2, . . . obtained by dividing the positioning area A0, respectively.

The positioning apparatus 20 having such a configuration realizes the function of the positioning section 212 by the processor 21 executing the information processing according to the positioning program.

Figure 8:
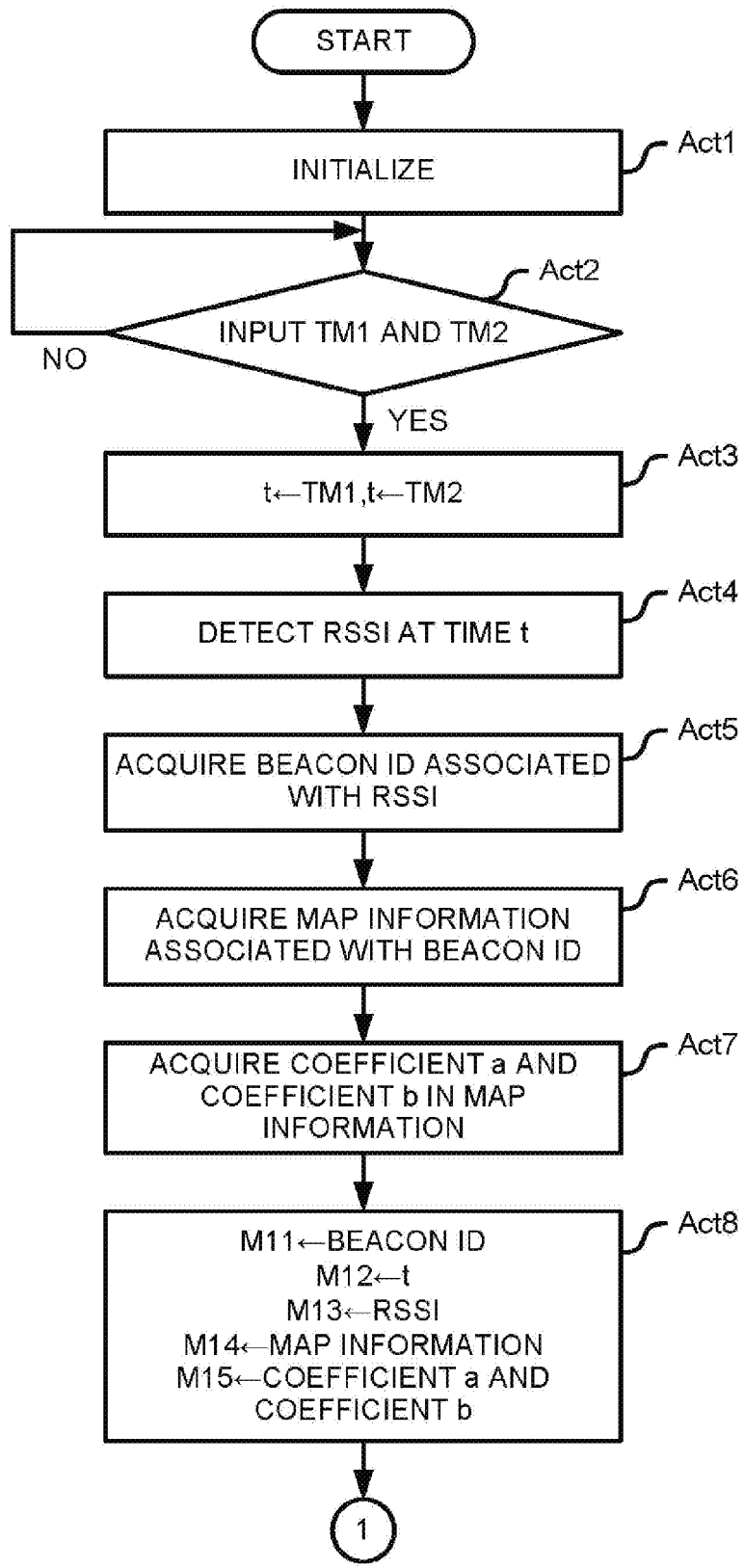
FIG. 8 is a flowchart depicting main procedures of an information processing executed by a processor of the positioning apparatus by executing a positioning program according to the first embodiment.
Figure 9:
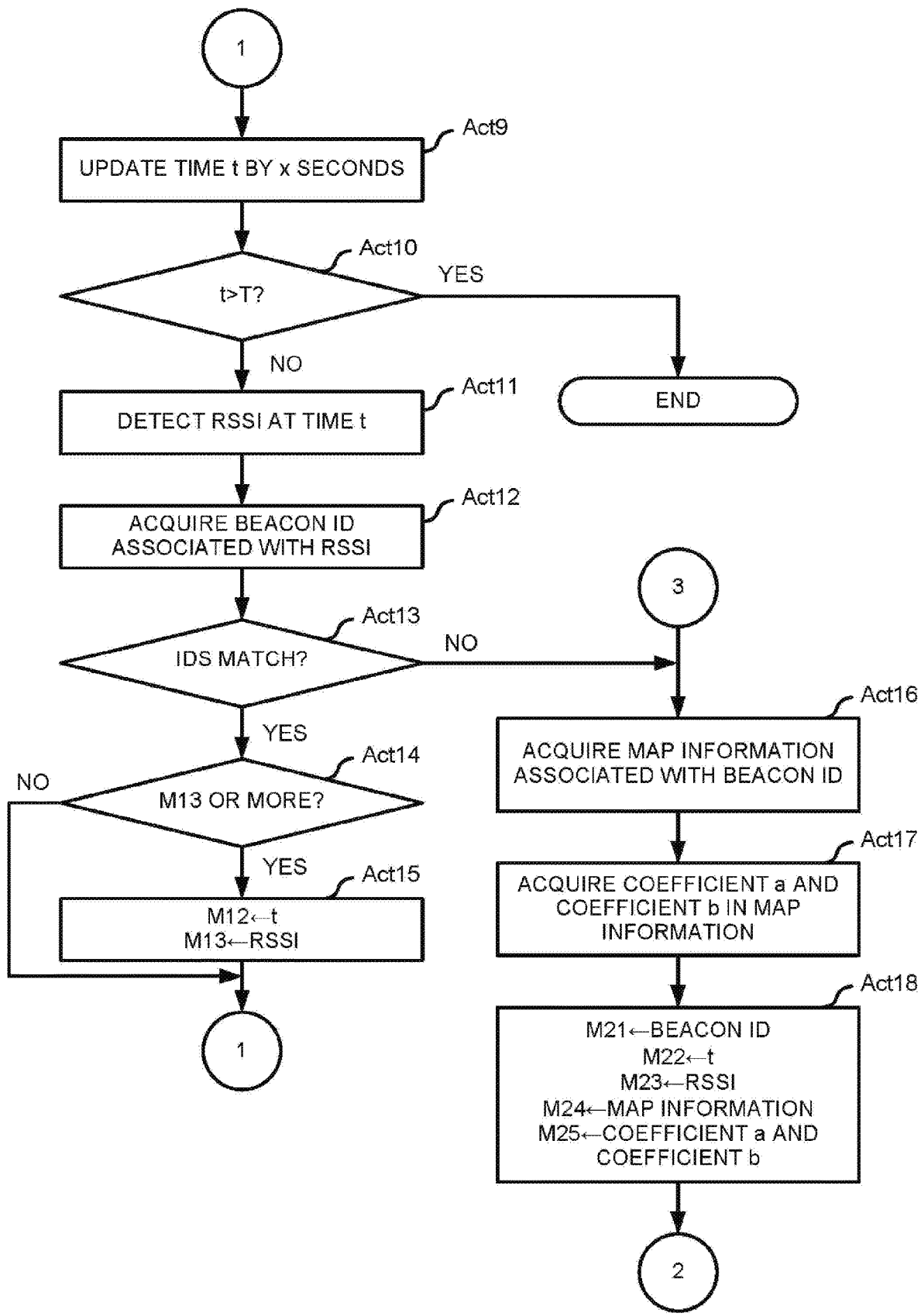
FIG. 9 is a flowchart depicting main procedures of an information processing executed by the processor of the positioning apparatus by executing the positioning program according to the first embodiment.
Figure 10:
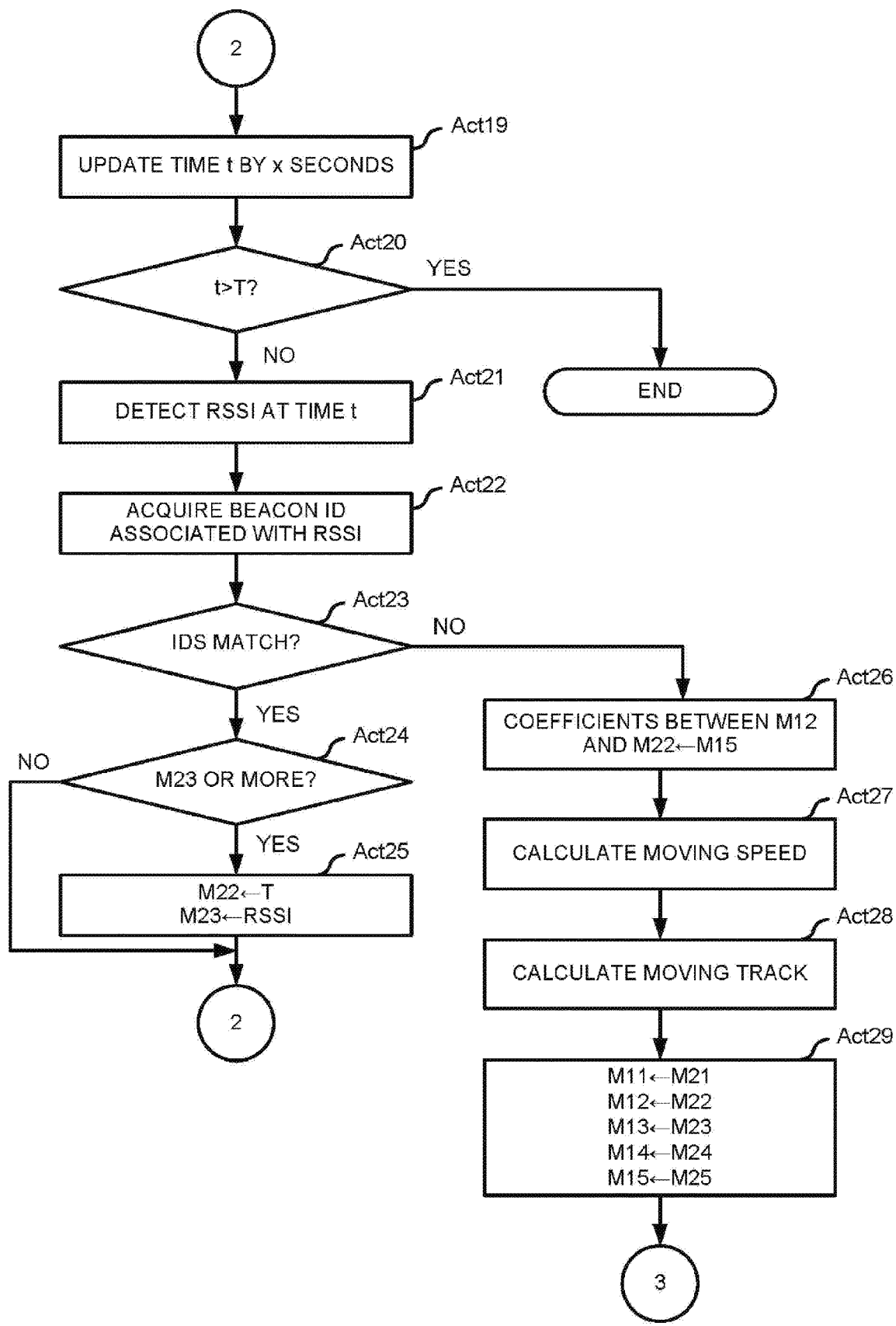
FIG. 10 is a flowchart depicting main procedures of an information processing executed by the processor of the positioning apparatus by executing the positioning program according to the first embodiment.

FIG. 8 to FIG. 10 are flowcharts depicting the main procedures of an information processing executed by the processor 21 by executing the positioning program. Before starting the processing, it is assumed that the data shown in FIG. 4 to FIG. 7 is recorded as an example in the first table 231, the second table 232, the third table 233 and the fourth table 234, respectively.

The operator of the positioning apparatus 20 operates the touch panel 25 to instruct start of the positioning program. If the positioning program is started in response to the instruction, the processor 21 starts an information processing having the procedures shown in the flowchart in FIG. 8. First, the processor 21 performs initialization in Act 1. By this initialization, a first time area t and a second time area T are cleared. A first work area M11, a second work area M12, a third work area M13, a fourth work area M14, a fifth work area M15, a sixth work area M21, a seventh work area M22, an eighth work area M23, a ninth work area M24 and a tenth work area M25 are cleared. The first time area t and the second time area T and the first to tenth work areas M11, M12, M13, M14, M15, M21, M22, M23, M24 and M25 are all the nonvolatile memory areas in the main memory 22.

If the positioning program is started, input boxes for a positioning start time TM1 and a positioning termination time TM2 are displayed on the touch panel 25. The operator of the positioning apparatus 20 operates the touch panel 25 to input the positioning start time TM1 and the positioning termination time TM2 into the input boxes. For example, the operator inputs "10:10:10" as the positioning start time TM1 and "10:11:00" as the positioning termination time TM2. The input of the positioning termination time TM2 may be omitted.

If the initialization is terminated, the processor 21 stands by until the positioning start time TM1 and the positioning termination time TM2 are input in Act 2. If at least the positioning start time TM1 is input, the processor 21 determines YES in Act 2 and proceeds to the processing in Act 3. In Act 3, the processor 21 records the positioning start time TM1 in the first time area t, and records the positioning termination time TM2 in the second time area T. If the positioning termination time TM2 is not input, the current time counted by the clock 24 is recorded in the second time area T.

In Act 4, the processor 21 retrieves the first table 231 to detect a RSSI value included in the beacon data recorded in association with the time recorded in the first time area t. In Act 5, the processor 21 acquires the beacon ID included in the same beacon data. In Act 6, the processor 21 retrieves the third table 233 with the beacon ID acquired by the processing in Act 5 to acquire the map information MAP recorded in association with the beacon ID. In Act 7, the processor 21 retrieves the fourth table 234 with the map information MAP acquired by the processing in Act 6 to acquire the first coefficient a and the second coefficient b recorded in association with the map information MAP.

In Act 8, the processor 21 sets data in the first to fifth work areas M11 to M15. Specifically, the processor 21 sets the beacon ID acquired by the processing in Act 5 in the first work area M11. The processor 21 sets the time in the first time area t in the second work area M12. The processor 21 sets the RSSI value detected by the processing in Act 4 in the third work area M13. The processor 21 sets the map information MAP acquired by the processing in Act 6 in the fourth work area M14. The processor 21 sets the first coefficient a and the second coefficient b acquired by the processing in Act 7 in the fifth work area M15.

For example, when the operator inputs "10:10:10" as the positioning start time TM1, the beacon ID "100" is set in the first work area M11. The time "10:10:10" is set in the second work area M12. The RSSI value "−83" is set in the third work area M13. The map information "MAP1" is set in the fourth work area M14. In the fifth work area M15, the first coefficient a "C11" and the second coefficient b "C12" are set.

If the processing in Act 8 is terminated, the processor 21 proceeds to the processing in Act 9 in FIG. 9. The processor 21 updates the time in the first time area t by x seconds in Act 9. x seconds may be arbitrarily set. In the present embodiment, x seconds are set to one second. If the time in the first time area t is updated, the processor 21 determines whether or not the time in the first time area t after update exceeds the time in the second time area T in Act 10. If the time in the first time area t exceeds the time in the second time area T, the processor 21 determines Yes in Act 10. Then, the processor 21 terminates the information processing.

If the time in the first time area t does not exceed the time in the second time area T, the processor 21 determines No in Act 10. In Act 11, the processor 21 retrieves the first table 231 to detect the RSSI value included in the beacon data recorded in association with the time in the first time area t. In Act 12, the processor 21 acquires the beacon ID in the same beacon data. In Act 13, the processor 21 determines whether or not the beacon ID acquired by the processing in Act 12 matches with the beacon ID set in the first work area M11.

When the time in the first time area t is updated to "10:10:11" in Act 9, the beacon ID acquired by the processing in Act 12 is "100" and matches with the beacon ID set in the first work area M11. If both beacon IDs match, the processor 21 determines Yes in Act 13.

In Act 14, the processor 21 determines whether or not the RSSI value detected by the processing in Act 11 is equal to or greater than the RSSI value set in the third work area M13. If the RSSI value detected by the processing in Act 11 is less than the RSSI value in the third work area M13, the processor 21 determines No in Act 14. The processor 21 then returns to the processing in Act 9.

If the RSSI value detected by the processing in Act 11 is equal to or greater than the RSSI value in the third work area M13, the processor 21 determines Yes in Act 14. In Act 15, the processor 21 updates the data in the second work area M12 and the data in the third work area M13. Specifically, the processor 21 rewrites the data in the second work area M12 to the time recorded in the first time area t. The processor 21 rewrites the data of the third work area M13 to the RSSI value detected by the processing in Act 11. After that, the processor 21 returns to the processing in Act 9.

When the time recorded in the first time area t is updated to "10:10:11" in Act 9, the RSSI value detected by the processing in Act 11 is "−80", which is equal to or greater than the RSSI value in the third work area M13. Therefore, by the processing in Act 15, the data recorded in the second work area M12 is rewritten to "10:10:11". The data in the third work area M13 is rewritten to "−80".

By returning to the processing in Act 9, the time in the first time area t is updated to "10:10:12". At this time, the RSSI value detected by the processing in Act 11 is "−84", which is smaller than the RSSI value "−80" in the third work area M13. The beacon ID acquired by the processing in Act 12 matches with the beacon ID set in the first work area M11. Therefore, the data in the second work area M12 and the third work area M13 is not rewritten. Subsequently, even when the time set in the first time area t is updated to "10:10:13", the operation is performed in the same way as the case of being updated to "10:10:12".

Thus, when the time in the first time area t becomes "10:10:13", in the first work area M11, the beacon ID "100" is set. In the second work area M12, the time "10:10:11" is set. In the third work area M13, the RSSI value "−80" is set. In the fourth work area M14, the map information "MAP1" is set. In the fifth work area M15, the first coefficient a "C11" and the second coefficient b "C12" are set. The time "10:10:11" set in the second work area M12 is the time when the positioning apparatus 20 receives the beacon signal having the beacon ID "100" at the maximum reception strength.

When the time in the first time area t is updated to "10:10:14" in Act 9, the beacon ID acquired in the processing in Act 12 is "200". Therefore, in Act 13, it is determined that the both beacon IDs do not match.

If it is determined that the both beacon IDs do not match, the processor 21 determines No in Act 13. In Act 16, the processor 21 retrieves the third table 233 with the beacon ID acquired by the processing in Act 12 to acquire the map information MAP recorded in association with the beacon ID. In Act 17, the processor 21 retrieves the fourth table 234 with the map information MAP acquired by the processing in Act 16 to acquire the first coefficient a and the second coefficient b recorded in association with the map information MAP.

In Act 18, the processor 21 sets data in the sixth to tenth work areas M21 to M25. Specifically, the processor 21 sets the beacon ID acquired by the processing in Act 12 in the sixth work area M21. The processor 21 sets the time in the first time area t in the seventh work area M22. The processor 21 sets the RSSI value detected by the processing in Act 11 in the eighth work area M23. The processor 21 sets the map information MAP acquired by the processing in Act 16 in the ninth work area M24. The processor 21 sets the first coefficient a and the second coefficient b acquired by the processing in Act 17 in the tenth work area M25.

Therefore, when the time in the first time area t is updated to "10:10:14", the beacon ID "200" is set in the sixth work area M21. The time "10:10:14" is set in the seventh work area M22. The RSSI value "−86" is set in the eighth work area M23. The map information "MAP1" is set in the ninth work area M24. The first coefficient a "C11" and the second coefficient b "C12" are set in the tenth work area M25.

If the processing in Act 18 is terminated, the processor 21 proceeds to the processing in Act 19 in FIG. 10. In Act 19, the processor 21 further updates the time in the first time area t by x seconds. In Act 20, the processor 21 determines whether or not the time in the first time area t after update exceeds the time in the second time area T. If the time in the first time area t exceeds the time in the second time area T, the processor 21 determines Yes in Act 20. Then, the processor 21 terminates the information processing.

If the time in the first time area t does not exceed the time in the second time area T, the processor 21 determines No in Act 20. In Act 21, the processor 21 retrieves the first table 231 to detect the RSSI value in the beacon data recorded in association with the time in the first time area t. In Act 22, the processor 21 acquires the beacon ID in the same beacon data. In Act 23, the processor 21 determines whether or not the beacon ID acquired by the processing in Act 22 matches with the beacon ID set in the sixth work area M21.

When the time in the first time area t is updated to "10:10:15" in Act 19, the beacon ID acquired by the processing in Act 22 is "200". The beacon ID "200" matches with the beacon ID set in the sixth work area M21. If both beacon IDs match, the processor 21 determines Yes in Act 23.

In Act 24, the processor 21 determines whether or not the RSSI value detected by the processing in Act 21 is equal to or greater than the RSSI value set in the eighth work area M23. If the RSSI value detected in the processing in Act 21 is less than the RSSI value of the eighth work area M23, the processor 21 determines No in Act 24. The processor 21 then returns to the processing in Act 19.

If the RSSI value detected by the processing in Act 21 is equal to or greater than the RSSI value in the eighth work area M23, the processor 21 determines Yes in Act 24. In Act 25, the processor 21 updates the data in the seventh work area M22 and the data in the eighth work area M23. Specifically, the processor 21 rewrites the data in the seventh work area M22 to the time in the first time area t. The processor 21 rewrites the data in the eighth work area M23 to the RSSI value detected by the processing in Act 21. After that, the processor 21 returns to the processing in Act 19.

When the time in the first time area t is updated to "10:10:15" in Act 19, the RSSI value detected by the processing in Act 21 is "−82", which is equal to or greater than the RSSI value in the eighth work area M23. Therefore, by the processing in Act 25, the data in the seventh work area M22 is rewritten to "10:10:15". The data in the eighth work area M23 is rewritten to "−82".

By returning to the processing in Act 19, the time in the first time area t is updated to "10:10:16". At this time, the RSSI value detected by the processing in Act 21 is "−85", which is smaller than the RSSI value "−82" of the eighth work area M23. The beacon ID acquired by the processing in Act 22 matches with the beacon ID "200" in the sixth work area M21. Therefore, the data in the seventh work area M22 and the eighth work area M23 cannot be rewritten. The same operation is performed when the time in the first time area t is updated to "10:10:17".

Thus, when the time in the first time area t becomes "10:10:17", the beacon ID "200" is set in the sixth work area M21. The time "10:10:15" is set in the seventh work area M22. The RSSI value "−82" is set in the eighth work area M23. The map information "MAP1" is set in the ninth work area M24. The first coefficient a "C11" and the second coefficient b "C12" are set in the tenth work area M25. The time "10:10:15" set in the seventh work area M22 is the time when the positioning apparatus 20 receives the beacon signal with the beacon ID "200" at the maximum reception strength.

When the time in the first time area t is updated to "10:10:18" in Act 19, the beacon ID detected by the processing in Act 22 is "300". Therefore, in Act 23, it is determined that the both beacon IDs do not match.

If it is determined that the both beacon IDs do not match, the processor 21 determines No in Act 23. In Act 26, the processor 21 records the first coefficient a "C11" and the second coefficient b "C12" set in the fifth work area M15 in respective areas of the first coefficient a and the second coefficient b in the second table 232 in a period from the time "10:10:11" set in the second work area M12 to the time "10:10:15" set in the seventh work area M22.

If the processing in Act 26 is terminated, in Act 27, the processor 21 calculates a moving speed of the moving object CA at the time at which the first coefficient a and the second coefficient b are recorded in Act 26. Specifically, the processor 21 calculates a standard deviation W of the angular velocity for each time from the angular velocity at each time.

For each time from the time "10:10:11" to the time "10:10:15", the processor 21 calculates the moving speed S by putting the standard deviation W of the angular velocity at each time and the first coefficient a "C11" and the second coefficient b "C12" into the linear function indicated by Formula (1). The processor 21 records the moving speed S calculated for each time in the second table 232 in association with each time from the time "10:10:11" to the time "10:10:15".

If the processing in Act 27 is terminated, the processor 21 calculates a moving track of the moving object CA from the from the time "10:10:11" set in the second work area M12 to the time "10:10:15" set in the seventh work area M22 in Act 28. Specifically, the processor 21 sets absolute coordinates of the beacon emitter 10A specified by the beacon ID "100" set in the first work area M11 to a position indicated by relative coordinates at the time "10:10:11" of the moving object CA. Similarly, the processor sets absolute coordinates of the beacon emitter 10B specified by the beacon ID "200" set in the sixth work area M21 to a position indicated by relative coordinates at the time "10:10:15" of the moving object CA. Then, based on the integration data of each of the angle and the moving speed from the time "10:10:11" to the time "10:10:15" in the second table 232, the processor 21 calculates the moving track of the moving object CA connecting the beacon emitter 10A to the beacon emitter 10B.

Here, the computer having the processor 21 as the central portion specifies the division areas A1, A2, . . . where the moving object CA is positioned per unit time by the processing in Act 4 to Act 6 and the processing in Act 11 to Act 16. The computer acquires the first coefficient a and the second coefficient b stored in the fourth table 234 in association with the division areas A1, A2, . . . by the processing in Act 7 and Act 17. The computer calculates the moving speed of the moving object CA in the division area from the first coefficient a and the second coefficient b and the standard deviation of the angular velocity by the processing in Act 26 and Act 27. The computer measures the position of the moving object CA in the positioning area A0 from the moving speed and the azimuth angle of the moving object CA by the processing in Act 28. In other words, the computer functions as the positioning section 212.

If the processing in Act 28 is terminated, the processor 21 rewrites the data in the first to fifth work areas M11 to M15 to data in the sixth to tenth work areas in Act 29. Then, the processor 21 returns to the processing in Act 16. Specifically, the processor 21 retrieves the third table 233 with the beacon ID acquired by the processing in Act 22 to acquire the map information MAP recorded in association with the beacon ID. In Act 17, the processor 21 retrieves the fourth table 234 with the map information MAP acquired by the processing in Act 16 to acquire the first coefficient a and the second coefficient b recorded in association with the map information MAP.

The processor 21 sets data in the sixth to tenth work areas M21 to M25 in Act 18. Specifically, the processor 21 sets the beacon ID acquired by the processing in Act 22 in the sixth work area M21. The processor 21 sets the time in the first time area t in the seventh work area M22. The processor 21 sets the RSSI value detected by the processing in Act 21 in the eighth work area M23. The processor 21 sets the map information acquired by the processing in Act 16 in the ninth work area M24. The processor 21 sets the first coefficient a and the second coefficient b acquired by the processing in Act 17 in the tenth work area M25.

Therefore, when the time in the first time area t is updated to "10:10:18" in Act 19, the beacon ID "200" is set in the first work area M11 by the processing in Act 29. The time "10:10:15" is set in the second work area M12. The RSSI value "−82" is set in the third work area M13. The map information "MAP1" is set in the fourth work area M14. The first coefficient a "C11" and the second coefficient b "C12" are set in the fifth work area M15. By the processing in Act 18, the beacon ID "300" is set in the sixth work area M21. The time "10:10:18" is set in the seventh work area M22. The RSSI value "−85" is set in the eighth work area M23. The map information "MAP2" is set in the ninth work area M24. The first coefficient a "C21" and the second coefficient b "C22" are set in the tenth work area M25.

If the processing in Act 18 is terminated, the processor 21 proceeds to the processing in Act 19 in FIG. 10 as described above. When the time in the first time area t is updated to "10:10:19" in Act 19, the RSSI value detected by the processing in Act 21 is "−82", which is equal to or greater than the RSSI value in the eighth work area M23. Therefore, the data in the seventh work area M22 is rewritten to "10:10:19" by the processing in Act 25. The data in the eighth work area M23 is rewritten to "−82".

If the processing in Act 25 is terminated, the processor 21 returns to the processing in Act 19 as described above. In Act 19, when the time in the first time area t is updated to "10:10:20", the RSSI value detected in the processing in Act 21 is "−81", which is greater than or equal to the RSSI value of the eighth work area M23 is there. Therefore, by the processing in Act 25 again, the data of the seventh work area M22 is rewritten to "10:10:20". The data in the eighth work area M23 is rewritten to "−81".

When the time in the first time area t is updated to "10:10:21" in Act 19, the RSSI value detected by the processing in Act 21 is "−84", which is smaller than the RSSI value of the eighth work area M23. The beacon ID acquired by the processing in Act 22 is "300", which matches with the beacon ID in the sixth work area M21. Therefore, the data in the sixth work area M21 to the tenth work area M25 is not updated.

When the time in the first time area t is updated to "10:10:22" in Act 19, the beacon ID detected by the processing in Act 22 becomes "400", which does not match with the beacon ID of the sixth work area M21. Therefore, the processor 21 executes the processing in Act 26 to Act 29 described above.

As a result, in each area of the first coefficient a and the second coefficient b from the time "10:10:15" to the time "10:10:20" in the second table 232, the first coefficient a "C11" and the second coefficient b "C12" set in the fifth work area M15 are recorded. From the first coefficient a "C11" and the second coefficient b "C12" and the standard deviation W of the angular velocity, the moving speed S at each time from the time "10:10:15" to the time "10:10:20" is calculated. The moving speed is recorded in the second table 232. Furthermore, based on the moving speed and the angle at each time from the time "10:10:15" to the time "10:10:20", the moving track of the moving object CA therebetween is calculated.

Thereafter, the beacon ID "300" is set in the first work area M11. The time "10:10:20" is set in the second work area M12. The RSSI value "−81" is set in the third work area M13. The map information "MAP2" is set in the fourth work area M14. The first coefficient "C21" and the second coefficient "C22" are set in the fifth work area M15. Then, the processor 21 returns to the processing in Act 16 and repeats the processing in the same way as described above.

Therefore, when the processor 21 executes the processing in Act 26 to Act 29 next, the first coefficient a "C21" and the second coefficient b "C22" set in the fifth work area M15 are recorded respectively in areas of the first coefficient a and the second coefficient b in the second table 232 after the time "10:10:20". From the first coefficient a "C21" and the second coefficient b "C22" and the standard deviation W of the angular velocity, the moving speed S at each time after the time "10:10:20" is calculated. Furthermore, based on the moving speed and the angle at each time after the time "10:10:20", the moving track of the moving object CA during that time is calculated.

In this way, in a layout example shown in FIG. 2, the moving speed of the moving object CA moving in the direction from the beacon emitter 10A to the beacon emitter 10B is calculated using the first coefficient a "C11" and the second coefficient b "C12" set for the division area A1. Both the beacon emitter 10A and the beacon emitter 10B are placed in the division area A1. The first coefficient a "C11" and the second coefficient b "C12" are the coefficient a and the coefficient b in a linear function to be established between the moving speed and the standard deviation W of the angular velocity (rad/s) with respect to the material of the surface on which the moving object CA moves in the division area A1. Therefore, within the interval from the beacon emitter 10A to the beacon emitter 10B, the moving speed of the moving object CA can be accurately calculated.

In the same layout example, the moving speed of the moving object CA moving from the beacon emitter 10B to the beacon emitter 10C is calculated using the first coefficient a "C11" and the second coefficient b "C12" set for the division area A1. The beacon emitter 10B is positioned in the division area A1. Therefore, the moving speed of the moving object CA until it crosses a boundary line BD between the division area A1 and the division area A2 from the beacon emitter 10B can be accurately calculated.

The beacon emitter 10C is positioned in the division area A2. Therefore, from the boundary line BD to the beacon emitter 10C, the moving speed of the moving object CA may not be calculated accurately. However, since that interval is quite short when compared with a distance by which the moving object CA moves in the positioning area A0, there is no big problem.

The moving speed of the moving object CA moving in a direction from the beacon emitter 10C to the beacon emitter 10D is calculated by using the first coefficient a "C21" and the second coefficient b "C22" set for the division area A2. Both the beacon emitter 10C and the beacon emitter 10D are positioned in the division area A2. The first coefficient a "C21" and the second coefficient b "C22" are the coefficient a and the coefficient b of a linear function to be established between the standard deviation W of the angular velocity (rad/s) and the moving speed with respect to the material of the surface on which the moving object CA moves in the division area A2. Therefore, within the interval from the beacon emitter 10C to the beacon emitter 10D, the moving speed of the moving object CA can be accurately calculated.

Thus, according to the positioning apparatus 20 of the present embodiment, since the moving speed of the moving object CA can be accurately calculated regardless of the state of the surface on which the moving object CA moves, the position of the moving object CA can be accurately measured. In particular, in the case in which a floor surface in which surfaces made of different material are bonded is set as the positioning area A0 of the moving object CA regardless of whether it is in an indoor space or an outdoor space, since the coefficient becomes a coefficient suitable for the material of the floor surface at an appropriate timing, the positioning apparatus 20 of this embodiment is very effective from the viewpoint of accuracy.

The positioning apparatus 20 of the present embodiment has the strength measurement section 271 for measuring the reception strength of the beacon signal transmitted from the beacon emitter 10 placed in the positioning area A0. Then, the processor 21 of the positioning apparatus 20 specifies the beacon emitter 10 for which the reception strength of the beacon signal measured by the strength measurement section 271 is largest, and specifies that the moving object CA is positioned in the division area where the beacon emitter 10 is positioned. Therefore, the positioning apparatus 20 can easily specify the division area where the moving object CA is positioned.

Second Embodiment

Next, a second embodiment of the positioning apparatus which can accurately measure the position of the moving object irrespective of the state of the surface on which the moving object moves is described with reference to FIG. 11 to FIG. 13. The same components as the first embodiment are denoted with the same reference numerals, and a detailed description thereof is omitted.

Figure 11:
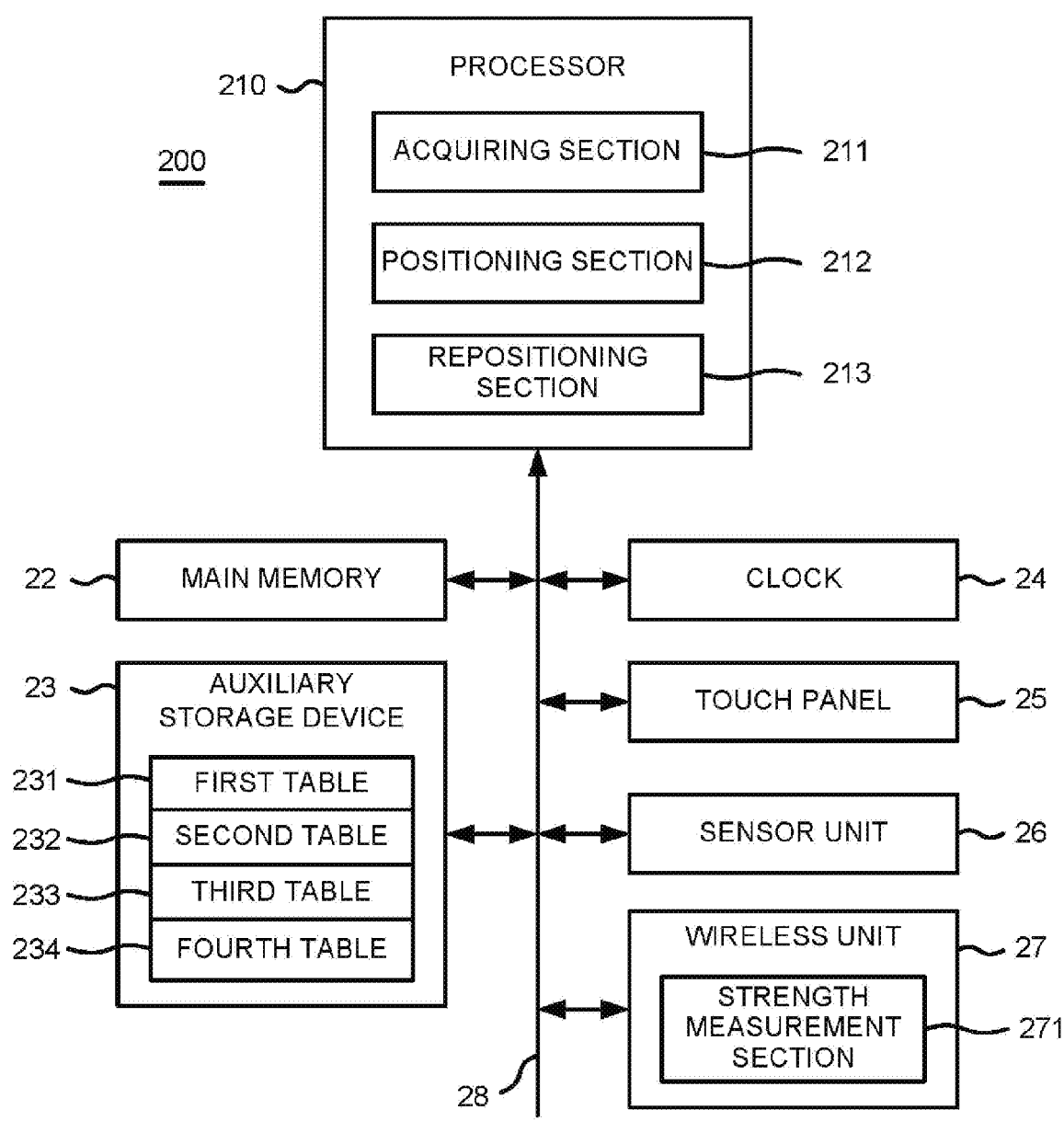
FIG. 11 is a block diagram illustrating a circuit configuration of main portions of a positioning apparatus according to a second embodiment.

FIG. 11 is a block diagram illustrating a circuit configuration of main portions of a positioning apparatus 200 according to the second embodiment. The positioning apparatus 200 differs from the positioning apparatus 20 of the first embodiment in that a processor 210 further has a function of a repositioning section 213 in addition to the function as the acquiring section 211 and the positioning section 212.

The repositioning section 213 calculates the track of the moving object CA moving in the positioning area A0 from the positioning result by the positioning section 212. The repositioning section 213 calculates a position where the track of the moving object CA crosses the boundary line BD of two adjacent division areas, for example, the division areas A1 and A2. The repositioning section 213 acquires the first coefficient a and the second coefficient b stored in the fourth table 234 in association with the division area A1 for the division area A1 which is the one of two adjacent division areas A1 and A2, and acquires the first coefficient a and the second coefficient b stored in the fourth table 234 in association with the division area A2 for the division area A2 which is the other one. The repositioning section 213 repositions the position of the moving object CA using the first coefficient a and the second coefficient b acquired for each of the division areas A1 and A2.

Figure 12:
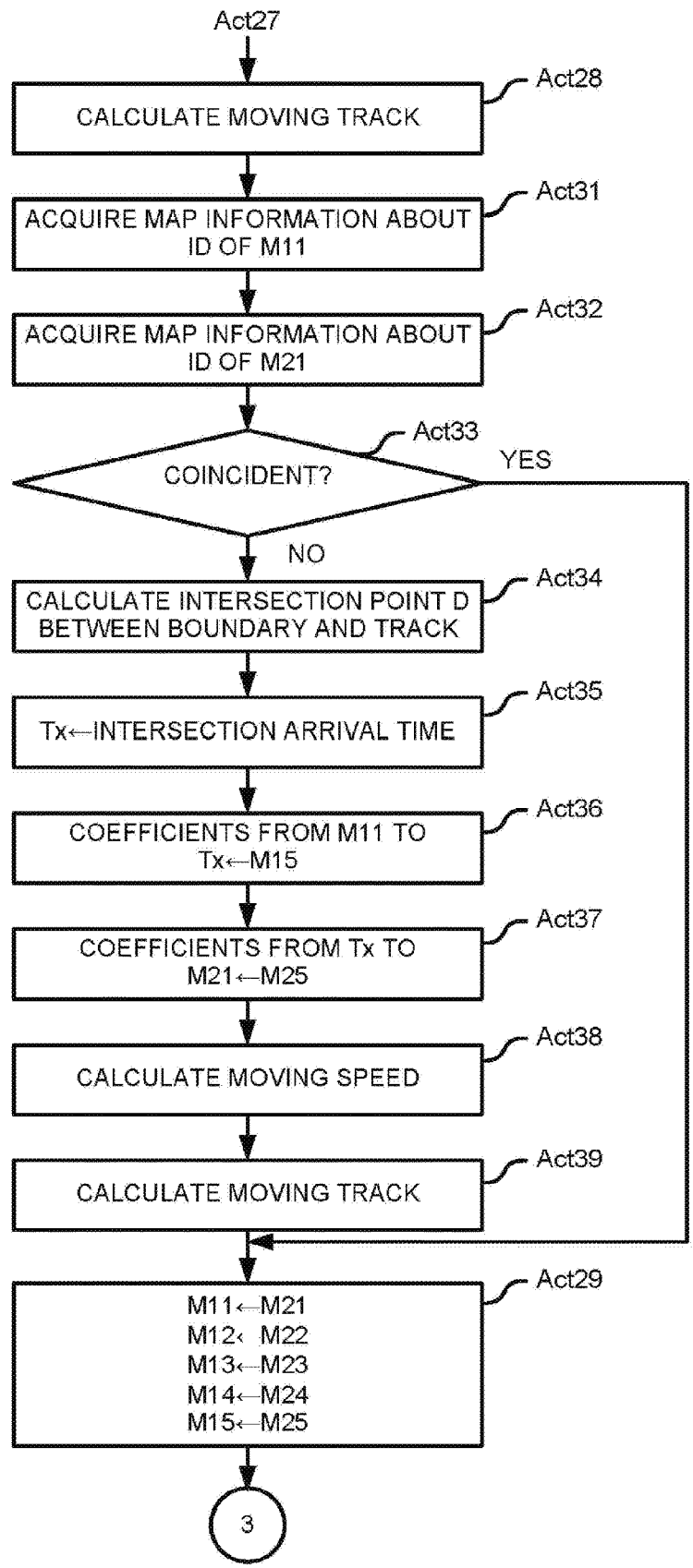
FIG. 12 is a flowchart depicting main procedures of an information processing executed by a processor of the positioning apparatus by executing a positioning program according to the second embodiment.

FIG. 12 is a flowchart depicting main procedures of an information processing executed by the processor 210 of the positioning apparatus 200 by executing the positioning program. FIG. 12 shows processing procedures executed between Act 28 and Act 29 shown in FIG. 10 in the same manner as the procedure description in the first embodiment. Specifically, the second embodiment differs from the first embodiment in that the processing in Act 31 to Act 39 is executed between Act 28 and Act 29 shown in FIG. 10.

Specifically, after calculating the moving track of the moving object CA in Act 28, in Act 31, the processor 210 retrieves the third table 233 with the beacon ID set in the first work area M11 to acquire the map information MAP recorded in association with the beacon ID. In Act 32, the processor 210 retrieves the third table 233 with the beacon ID set in the sixth work area M21 to acquire the map information MAP recorded in association with the beacon ID.

In Act 33, the processor 210 determines whether or not the map information MAP acquired by the processing in Act 31 matches with the map information MAP acquired by the processing in Act 32. If they match, the processor 210 determines Yes in Act 33. Then, the processor 210 executes the processing in Act 29. If they do not match, the processor 210 determines No in Act 33. Then, the processor 210 executes the processing in Act 34 to Act 39.

As described in the first embodiment, when the time in the first time area t is updated to "10:10:18" in Act 19 in FIG. 10 and the processing in Act 26 to Act 28 is executed, a track connecting the beacon emitter 10A with the beacon emitter 10B is calculated. At this time, the map information MAP1 acquired by the processing in Act 31 matches with the map information MAP1 acquired by the processing in Act 32. Therefore, the processor 210 determines Yes in Act 33, skips the processing in Act 34 to Act 39, and then executes the processing in Act 29.

Figure 13:
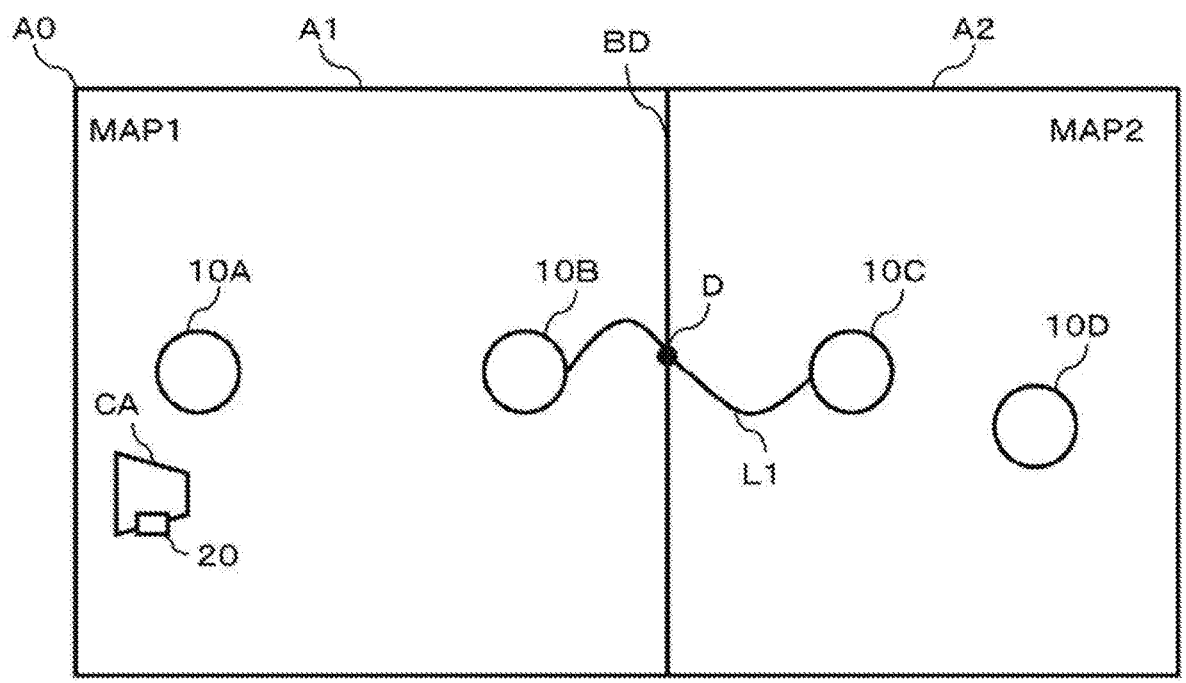
FIG. 13 is a diagram for explaining the second embodiment.

On the other hand, when the time in the first time area t is updated to "10:10:22" in Act 19 and the processing in Act 26 to Act 28 is executed, as shown in FIG. 13, a track L1 connecting the beacon emitter 10B with the beacon emitter 10C is calculated. At this time, the map information MAP1 acquired by the processing in Act 31 matches with the map information MAP2 acquired by the processing in Act 32. Therefore, the processor 210 determines No in Act 33 to execute the processing in Act 34 to Act 39

Specifically, the processor 210 calculates an intersection point D at which the track L1 of the moving object CA crosses the boundary line BD between the division area A1 and the division area A2. Then, the processor 210 calculates a time Tx at which the moving object CA reaches the intersection point D based on the data stored in the second table 232. As described above, the processor 21 can calculate the moving track of the moving object CA for connecting the beacon emitter 10B to the beacon emitter 10C based on the integration data of each of the angle and the moving speed from the time "10:10:15" to the time "10:10:20" in the second table 232. On the other hand, the position of the boundary line BD between the division area A1 and the division area A2 is previously known. Therefore, the time at which the moving track of the moving object CA crosses the boundary line BD is calculated as an intersection arrival time Tx.

In Act 36, the processor 210 sets the first coefficient a and the second coefficient b in the second table 232 from the time "10:10:15" recorded in the second work area M12 to the intersection arrival time Tx to the first coefficient a "C11" and the second coefficient b "C12" recorded in the fifth work area M15. In Act 37, the processor 210 sets the first coefficient a and the second coefficient b in the second table 232 from the intersection arrival time Tx to the time "10:10:20" recorded in the seventh work area M22 to the first coefficient a "C21" and the second coefficient b "C22" recorded in the tenth work area M25.

Thereafter, in Act 38, the processor 210 calculates the moving speed in the same manner as in Act 27. In Act 39, the processor 210 calculates a moving track in the same manner as in Act 28. After that, the processor 210 executes the processing in Act 29.

The computer having the processor 210 as the central portion executes processing in Act 31 to Act 34 to calculate the intersection point D which is a position where the track of the moving object CA crosses the boundary line BD between two adjacent division areas, for example, the division areas A1 and A2. By executing the processing in Act 36 and Act 37, the computer acquires the first coefficient a and the second coefficient b stored in the fourth table 234 in association with the division area A1 for the division area A1 which is the one of the adjacent two division areas A1 and A2, and acquires the first coefficient a and the second coefficient b stored in the fourth table 234 in association with the division area A2 for the division area A2 which is the other one. The computer newly measures the position of the moving object CA using the first coefficient a and the second coefficient b acquired for each of the division areas A1 and A2 by executing the processing in Act 38 and Act 39. In other words, the computer functions as the repositioning section 213.

As described above, according to the second embodiment, as shown in FIG. 13, when the moving object CA crosses the areas A1 and A2 where the material of the surface on which the moving object CA moves is different, the coefficients "C11" and "C12" corresponding to the area A1 are used as the first coefficient a and the second coefficient b for calculating the moving speed from the area A1 to the boundary line BD. The coefficients "C21" and "C22" corresponding to the area A2 are used as the first coefficient a and the second coefficient b for calculating the moving speed after entering the area A2 from the boundary line BD. Therefore, when compared with the first embodiment, the moving speed of the moving object CA moving in the direction from the beacon emitter 10B to the beacon emitter 10C can also be accurately calculated. Therefore, the positioning of the moving object CA can be performed with higher accuracy when compared with the first embodiment.

(Modification)

The positioning apparatus which can accurately measure the position of the moving object irrespective of the state of the surface on which the moving object moves is not limited to the first and second embodiments.

For example, a wireless communication terminal having an interface of a wireless LAN (Local Area Network) is provided in the moving object CA together with at least the sensor unit 26 and the wireless unit 27. The interface of the wireless LAN is used for transmitting the signal by the sensor of the sensor unit 26 and the RSSI value measured by the strength measurement section 271 to a server computer using the wireless communication. The server computer has an acquiring section for acquiring the signal by the sensor of the sensor unit 26 and the RSSI value measured in the strength measurement section 271 received from the wireless communication terminal. The server computer has the above-recorded storage section and the positioning section. By doing this, even with the server computer, the position of the moving object CA can be accurately measured. In this case, the positioning apparatus is composed of the wireless communication terminal and the server computer.

In the above embodiment, the positioning area A0 is divided into a plurality of the division areas A1, A2, . . . according to the material of the surface on which the moving object CA moves. For this point, even if the material of the surface is the same, for example, when there is a difference in friction coefficient of the surface, the positioning area A0 may be divided as different areas. Conversely, even if the material of the surface is different, if coefficients of the relational expression established between the moving speed and the standard deviation W of the angular velocity (rad/s) are equal, the positioning area A0 may not be divided.

In the above embodiment, a plurality of the beacon emitters 10 is placed in the positioning area A0. In another embodiment, a plurality of beacon receivers is placed in the positioning area A0. The wireless unit 27 of the positioning apparatus 20 is used as a transmitter of the beacon signal. In this embodiment, the beacon receiver may be any device as long as it can measure the strength of the beacon signal received from the positioning apparatus 20 and transmit the strength information to the positioning apparatus 20 transmitting the beacon signal. Alternatively, the positioning of the moving object CA may be performed by the server computer by transmitting the strength information to the server computer as described above.

The positioning apparatus is generally accessed in a state in which the positioning program is stored in the ROM. However, it is not limited to that, and the positioning apparatus may be accessed in a state in which the positioning program is not stored in the ROM. In this case, the positioning program separately transferred from the positioning apparatus is written into a writable storage device of the positioning apparatus in response to an operation performed by a user or the like. The transfer of the positioning program may be executed by recording it in a removable recording medium or through communication via a network. The form of the recording medium is not limited as long as it can store the program and can be read by the apparatus, such as a CD-ROM (compact disc read-only memory), a memory card or the like. The functions obtained by installing or downloading the program may be realized through cooperation with an OS (operating system) in the apparatus.

While certain embodiments have been recorded, these embodiments have been presented by way of example only, and are not intended to limit the scope of the invention. Indeed, the novel embodiments recorded herein may be embodied in a variety of other forms; furthermore, various omissions, substitutions and changes in the form of the embodiments recorded herein may be made without departing from the spirit of the invention. The accompanying claims and their equivalents are intended to cover such forms or modifications as would fall within the scope and spirit of the invention.

What is claimed is:

1. A positioning apparatus, comprising:
   a processor configured to:
   acquire an azimuth angle and an angular velocity of a moving object from values measured by sensors of the moving object moving in a positioning area, wherein the moving object moves on a surface of the positioning area via wheels;
   store a coefficient of a relational expression established between a moving speed and a standard deviation of the angular velocity of the moving object in association with each of a plurality of division areas for dividing the positioning area; and
   specify a division area where the moving object is positioned per unit time to acquire the coefficient in association with the division area, and to calculate the moving speed of the moving object in the division area from the coefficient and the standard deviation of the angular velocity to measure a position of the moving object in the positioning area from the moving speed and the azimuth angle of the moving object, wherein the coefficient is determined based on a material type of the surface associated with the division area.

2. The positioning apparatus according to claim 1, wherein the processor is further configured to:
   calculate a position where a track of the moving object moving in the positioning area crosses a boundary between two adjacent division areas from a positioning result, to acquire the coefficient in association with the division area for one division area of the two adjacent division areas, to acquire the coefficient in association with the division area for the other adjacent division area to newly measure the position of the moving object.

3. The positioning apparatus according to claim 1, wherein the processor is further configured to:
   measure a strength of radio waves transmitted and received to and from a plurality of fixed stations installed in the positioning area, wherein
   the processor specifies a division area in which the moving object is positioned according to a strength of radio waves transmitted and received to and from the plurality of fixed stations.

4. The positioning apparatus according to claim 2, wherein the processor is further configured to:
   measure a strength of radio waves transmitted and received to and from a plurality of fixed stations installed in the positioning area, wherein
   the processor specifies a division area in which the moving object is positioned according to a strength of radio waves transmitted and received to and from the plurality of fixed stations.

5. The positioning apparatus according to claim 1, wherein
   the division area differs from an adjacent division area in material of the surface on which the moving object moves.

6. The positioning apparatus according to claim 1, wherein
   the relational expression is a linear function.

7. A positioning method by a positioning apparatus comprising a processor configured to: acquire an azimuth angle and an angular velocity of a moving object from values measured by sensors of the moving object moving in a positioning area, wherein the moving object moves on a surface of the positioning area via wheels, and store a coefficient of a relational expression established between a moving speed and a standard deviation of the angular velocity of the moving object in association with each of a plurality of division areas for dividing the positioning area, comprising:
   specifying a division area where the moving object is positioned per unit time;
   acquiring the coefficient in association with the division area, wherein the coefficient is determined based on a material type of the surface associated with the division area;
   calculating the moving speed of the moving object in the division area from the coefficient and the standard deviation of the angular velocity; and
   measuring a position of the moving object in the positioning area from the moving speed and the azimuth angle of the moving object.

8. The positioning method according to claim 7, further comprising:
   calculating a position where a track of the moving object moving in the positioning area crosses a boundary between two adjacent division areas from a positioning result;
   acquiring the coefficient in association with the division area for one division area of the two adjacent division areas;
   acquiring the coefficient in association with the division area for the other adjacent division area to newly measure the position of the moving object.

9. The positioning method according to claim 7, further comprising:
    measuring a strength of radio waves transmitted and received to and from a plurality of fixed stations installed in the positioning area; and
    specifying a division area in which the moving object is positioned according to a strength of radio waves transmitted and received to and from the plurality of fixed stations.

10. The positioning method according to claim 8, further comprising:
    measuring a strength of radio waves transmitted and received to and from a plurality of fixed stations installed in the positioning area; and
    specifying a division area in which the moving object is positioned according to a strength of radio waves transmitted and received to and from the plurality of fixed stations.

11. The positioning method according to claim 7, wherein the division area differs from an adjacent division area in material of the surface on which the moving object moves.

12. The positioning method according to claim 7, wherein the relational expression is a linear function.

13. The positioning method according to claim 7, wherein the moving object is a shopping cart, an electric cart, a forklift, or a power-driven moving object.

14. A positioning system, comprising:
    sensors affixed to a moving object; and
    a processor configured to:
        acquire an azimuth angle and an angular velocity of the moving object from values measured by the sensors as the moving object moves in a positioning area wherein the moving object moves on a surface of the positioning area via wheels;
        store a coefficient of a relational expression established between a moving speed and a standard deviation of the angular velocity of the moving object in association with each of a plurality of division areas for dividing the positioning area; and
        specify a division area where the moving object is positioned per unit time to acquire the coefficient in association with the division area, and to calculate the moving speed of the moving object in the division area from the coefficient and the standard deviation of the angular velocity to measure a position of the moving object in the positioning area from the moving speed and the azimuth angle of the moving object, wherein the coefficient is determined based on a material type of the surface associated with the division area.

15. The positioning system according to claim 14, wherein the processor is further configured to:
    calculate a position where a track of the moving object moving in the positioning area crosses a boundary between two adjacent division areas from a positioning result, to acquire the coefficient in association with the division area for one division area of the two adjacent division areas, to acquire the coefficient in association with the division area for the other adjacent division area to newly measure the position of the moving object.

16. The positioning system according to claim 14, the processor further configured to:
    measure a strength of radio waves transmitted and received to and from a plurality of fixed stations installed in the positioning area, wherein
    the processor specifies a division area in which the moving object is positioned according to a strength of radio waves transmitted and received to and from the plurality of fixed stations.

17. The positioning system according to claim 15, the processor further configured to:
    measure a strength of radio waves transmitted and received to and from a plurality of fixed stations installed in the positioning area, wherein
    the processor specifies a division area in which the moving object is positioned according to a strength of radio waves transmitted and received to and from the plurality of fixed stations.

18. The positioning system according to claim 14, wherein
    the division area differs from an adjacent division area in material of the surface on which the moving object moves.

19. The positioning system according to claim 14, wherein
    the relational expression is a linear function.

20. The positioning system according to claim 14, wherein the moving object is a shopping cart, an electric cart, a forklift, or a power-driven moving object.

* * * * *